Dec. 3, 1929.  H. GÜTTINGER  1,738,102
QUICK ACTING REGULATOR
Filed Dec. 27, 1927
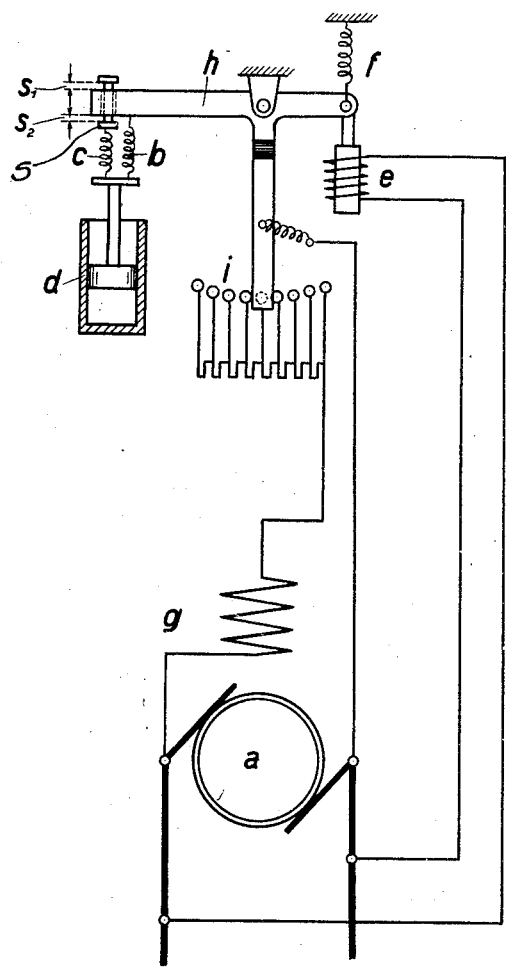

Patented Dec. 3, 1929

1,738,102

UNITED STATES PATENT OFFICE

HEINRICH GÜTTINGER, OF WETTINGEN, SWITZERLAND, ASSIGNOR TO AKTIENGESELL-SCHAFT BROWN, BOVERI AND CIE., OF BADEN, SWITZERLAND

QUICK-ACTING REGULATOR

Application filed December 27, 1927, Serial No. 242,902, and in Germany November 25, 1926.

This invention relates to automatic regulators and is particularly concerned with regulators of the quick-acting type as used for controlling the voltage, current, etc., of electrical machines.

The object of the invention is to provide a regulator for electrical machines which will operate with rapidity and smoothness over a large range.

Another object is the provision of a regulator of the type indicated in which hunting of the moving parts is prevented.

Other and further objects and advantages attained by the invention will be pointed out or indicated hereinafter or will be obvious to one skilled in the art upon an understanding of the invention.

In the drawing accompanying this specification is shown a specific embodiment of the invention, but it is to be understood that this is presented for purpose of illustration only and is not to be construed in any fashion having the effect of limiting the claims short of the true and most comprehensive scope of the invention in the art.

In the drawing,

The figure is a diagrammatic view of a regulator embodying the invention applied to the regulation of a dynamo-electric machine.

It is old in the art to provide some form of flexible coupling between the moving element of an electrical regulator which actuates the adjustable regulating resistance and the damping device, the object being to obtain smooth operation and prevent hunting and over-regulation. It frequently happens, however, that a certain degree of over-regulation is desirable, particularly when the quantity being regulated is subject to violent fluctuations as, for example, the voltage of a generator under sudden variations of load. If the spring connecting the moving element with the damping device is too weak, continual oscillation or hunting will result, the amplitude and duration of the oscillations being dependent on the initial impulse given by the moving element. In order to prevent hunting when the impulsive deflection of the moving element is large, a comparatively strong spring must be used and this prevents the moving element from closely following the fluctuations of the quantity being regulated. Consequently the regulator will no longer be quick acting. In addition to this the presence of a strong spring interferes with the proper action of the damping device and may thus constitute a fresh source of hunting.

These drawbacks are overcome in the present invention by providing the moving element of the regulator with a return-motion spring the strength of which increases at a greater rate than the deflection of the said moving element.

An understanding of the invention will be most readily obtained from the drawing which illustrates in diagrammatic fashion two embodiments of the same.

Figure 1 shows the regulating system for a direct-current dynamo, the reference character $a$ denoting the dynamo and $g$ the shunt field winding in the circuit of which is the adjustable resistance $i$. The rheostat arm is actuated by a solenoid $e$ connected to the terminals of the dynamo and controlled by a spring $f$. The rheostat arm $h$ is coupled to the damping piston $d$ by two springs $b$ and $c$ of unequal length. The spring $c$ is coupled in parallel with the spring $b$, but does not come into action until the rheostat arm has traversed the distance $s_1$ or $s_2$ on either side of the middle position. One end of the spring $c$ is connected to the plate at the end of the piston rod of the damper piston $d$; its other end is connected to an abutment pin $s$ which latter is guided in a hole bored in the lever $h$. With this arrangement of the springs, small deflections of the moving element within the set limits will be followed by considerable over-regulation and very quick action will thus be obtained. If the deflections were to exceed these limits the moving element would oscillate or hunt, the damping piston being inoperative owing to the weakness of the coupling spring. With the present arrangement, however, a deflection of the moving element beyond the limits set brings the second spring $c$ into operation and thus exerts a greater force on the damping piston. Moreover, the addition of the spring $c$ diminishes the possible momentary over-regulation and thus gives the damping piston more time to follow the movements of the regulating elements.

Instead of making the rate of increase of the strength of the coupling spring a discontinuous variable by the use of a plurality of springs which are successively brought into action, the change from a weak to a strong spring may be made continuous.

The exact form and arrangement of the return-motion spring is, however, a secondary consideration, the essential point being that as the deflection of the regulating element increases the increase in the strength of the spring is more than proportional thereto.

Having now described my invention, what I claim as new and desire to secure by Letters Patent is:—

1. A quick-acting regulator for electrical machines comprising, in combination, a moving element responsive to variations in the electrical quantity under regulation, a controlling spring therefor, a step by step variable resistance actuated by said moving element, a damping device, and a spring coupling between the moving element and the damping device, the strength of the coupling bearing an increasing ratio to the magnitude of the deflection of the moving element as the deflection increases.

2. A quick-acting regulator for electrical machines comprising, in combination, a moving element responsive to variations in the electrical quantity under regulation, a controlling spring therefor, a step by step variable resistance actuated by said moving element, a damping device, and a return-motion spring element connecting the aforesaid moving element with the damping device, the ratio between the returning force exerted by the spring element and the deflection of the moving element increasing progressively as the deflection increases.

3. A quick-acting regulator for electrical machines comprising, in combination, a moving element responsive to variations in the electrical quantity under regulation, a controlling spring therefor, a step by step variable resistance actuated by said moving element, a damping device, and a return-motion spring element connecting the moving element and the damping device and consisting of a plurality of springs of increasing strength adapted to be engaged successively as the deflection of the moving element increases.

4. A quick-acting regulator as in claim 3 in which the springs forming the return motion element are of unequal length and are coupled in parallel.

In testimony whereof I have signed my name to this specification.

HEINRICH GÜTTINGER.